*(12)* United States Patent
Chang et al.

(10) Patent No.: US 12,093,531 B2
(45) Date of Patent: Sep. 17, 2024

(54) HARDWARE ACCELERATOR

(71) Applicant: Cvitek Co. Ltd., Beijing (CN)

(72) Inventors: Wei-Chun Chang, Taoyuan (TW);
Yuan-Hsiang Kuo, Hsinchu (TW);
Chia-Lin Lu, Hsinchu (TW);
Hsueh-Chien Lu, Hsinchu (TW)

(73) Assignee: Cvitek Co. Ltd., Beijing (CN)

( * ) Notice: Subject to any disclaimer, the term of this patent is extended or adjusted under 35 U.S.C. 154(b) by 194 days.

(21) Appl. No.: 17/507,616

(22) Filed: Oct. 21, 2021

(65) Prior Publication Data

US 2022/0137826 A1    May 5, 2022

(30) Foreign Application Priority Data

Oct. 30, 2020   (CN) .......................... 202011196269.3

(51) Int. Cl.
*G06T 3/4046*   (2024.01)
*G06F 3/06*     (2006.01)
*G06F 12/02*    (2006.01)
*G06F 17/16*    (2006.01)
(Continued)

(52) U.S. Cl.
CPC .......... *G06F 3/0613* (2013.01); *G06F 3/0659* (2013.01); *G06F 3/0673* (2013.01); *G06F 12/0207* (2013.01); *G06F 17/16* (2013.01); *G06T 1/60* (2013.01); *G06T 3/4046* (2013.01); *G06T 2207/20084* (2013.01); *G06V 10/82* (2022.01)

(58) Field of Classification Search
CPC .... G06F 3/0113; G06F 3/0659; G06F 3/0673; G06F 12/0207; G06F 17/16; G06V 10/82; G06T 1/60; G06T 3/4046; G06T 2207/20084
See application file for complete search history.

(56) References Cited

U.S. PATENT DOCUMENTS

2017/0262174 A1*  9/2017 Newburn ............... G06F 9/4881
2018/0121786 A1*  5/2018 Narayanaswami .... G06N 3/045
(Continued)

OTHER PUBLICATIONS

An article titeld "Deep Learning: Methods and Applications" by Li Deng, et al., https://www.microsoft.com/en-us/research/wp-content/uploads/2016/02/DeepLearningBook_RefsByLastFirstNames.pdf (Year: 2014).*
(Continued)

*Primary Examiner* — Michael Krofcheck
*Assistant Examiner* — Janice M. Girouard
(74) *Attorney, Agent, or Firm* — Innovation Counsel LLP (57) ABSTRACT

A hardware accelerator is provided. The hardware accelerator includes a first memory; a source address generation unit coupled to the first memory; a data collection unit coupled to the first memory; a first data queue coupled to the data collection unit; a data dispersion unit coupled to the first data queue; a destination address generation unit coupled to the data dispersion unit; an address queue coupled to the destination address generation unit; a second data queue coupled to the data dispersion unit; and a second memory coupled to the second data queue. The hardware accelerator can perform anyone or any combination of tensor stride, tensor reshape and tensor transpose to achieve tensorflow depth-to-space permutation or tensorflow space-to-depth permutation.

9 Claims, 11 Drawing Sheets

(51) Int. Cl.
  *G06T 1/60*   (2006.01)
  *G06V 10/82*  (2022.01)

(56) References Cited

U.S. PATENT DOCUMENTS

2022/0138551 A1* 5/2022 Marani .................... G06N 3/08
                                                706/25
2022/0374347 A1* 11/2022 He ..................... G06F 12/0207

OTHER PUBLICATIONS

An article titled Convolutions: Transposed and Deconvolution by Mars Xiang, published Jul. 17, 2020 (Year: 2020).*

A screen shot of the webpage https://www.tensorflow.org/api_docs/python/tf/nn/depth_to_space taken by archive.org on Jan. 30, 2019. (Year: 2019).*

"Convolutions: Transposed and Deconvolution" by Mars Xiang, Jul. 17, 2020 available online at: https://medium.com/@marsxiang/convolutions-transposed-and-deconvolution-6430c358a5b6 that notes deconvolution is a mathematical operation that reverses a convolution layer. (Year: 2020).*

* cited by examiner

HARDWARE ACCELERATOR

This application claims the benefit of People's Republic of China application Serial No. 202011196269.3, filed Oct. 30, 2020, the subject matter of which is incorporated herein by reference.

BACKGROUND OF THE INVENTION

Field of the Invention

The invention relates in general to a hardware accelerator for tensor space-depth conversion.

Description of the Related Art

The booming growth in the processing and image analysis of big data and the application of artificial intelligence (AI) has driven experts to provide a most suitable architecture. The object of an AI hardware accelerator is to find a fastest and most power saving method for executing necessary computing tasks.

The application scenarios of AI hardware accelerator include: (1) cloud acceleration, which relates to compression/de-compression, blockchain and security, and requires a high ratio of computing performance to power consumption and cost; (2) storage: some applications require high efficiency performance and need to process data in the memory; (3) autopilot, which relates to the integration of AI, data computation and sensor fusion and requires programmability.

Therefore, it has become a prominent task for the industries to provide an AI hardware accelerator, which boosts the performance of hardware in response to different computing requirements of an AI neural network.

Additionally, the problem of frequent switching between AI hardware accelerator and CPU can be resolved, the loading of CPU can be reduced, and the overall AI computing efficiency can be increased.

SUMMARY OF THE INVENTION

According to one embodiment of the present invention, a hardware accelerator is provided. The hardware accelerator includes a first memory, a source address generation unit, a data collection unit, a first data queue, a data dispersion unit, a destination address generation unit, an address queue, a second data queue, and a second memory. The first memory is used for receiving data. The source address generation unit is coupled to the first memory for generating several source addresses to the first memory according to a source shape parameter and a source stride parameter, wherein the first memory transmits data according to the source addresses. The data collection unit coupled to the first memory for receiving data transmitted from the first memory. The first data queue is coupled to the data collection unit for temporarily storing data transmitted from the data collection unit. The data dispersion unit is coupled to the first data queue for dispersing data transmitted from the first data queue. The destination address generation unit is coupled to the data dispersion unit for generating several destination addresses according to a destination shape parameter and a destination stride parameter. The address queue is coupled to the destination address generation unit for temporarily storing the destination addresses generated by the destination address generation unit. The second data queue is coupled to the data dispersion unit for temporarily storing data transmitted from the data dispersion unit. The second memory is coupled to the second data queue for writing data transmitted from the second data queue according to the destination addresses generated by the destination address generation unit. The hardware accelerator performs any combination of tensor stride, tensor reshape and tensor transpose to achieve tensorflow depth-to-space permutation or tensorflow space-to-depth permutation.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the structural and operational principles of the present invention are disclosed below with accompanying drawings.

In deep learning, a tensor is a multidimensional array. Based on the number of dimensions, the tensor can be classified as 1D (one dimension) tensor, 2D tensor, 3D tensor, 4D tensor . . . . In the present invention, data is exemplarily in the form of 4D tensor, but the present invention is not limited thereto. In other possible embodiments of the present invention, data can be in the form of 3D tensor or a higher dimension (such as 5D tensor) and are still within the spirit of the present invention.

Figure 1A:
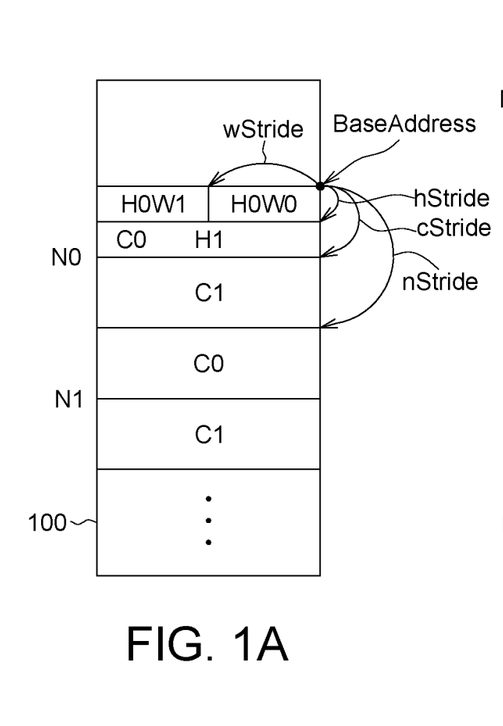
FIG. 1A is a schematic diagram of an exemplary example of 4D tensor data stored in a memory.

FIG. 1A is a schematic diagram of an exemplary example of 4D tensor data stored in a memory 100. In the present invention, the shape parameter of 4D tensor data is defined as: (n, c, h, w), which represents the numbers of points in a 4D shape; the stride parameter of 4D tensor data is defined as: (nStride, cStride, hStride, wStride), which represents point-to-point distances. That is, nStride (abbreviated as ns) represents the distance from one point n to another point n;

cStride (abbreviated as cs) represents the distance from one point c to another point c; hStride (abbreviated as hs) represents the distance from one point h to another point h; wStride (abbreviated as ws) represents the distance from one point w to another point. BA represents the base address, which can also be abbreviated as BA.

Figure 1B:
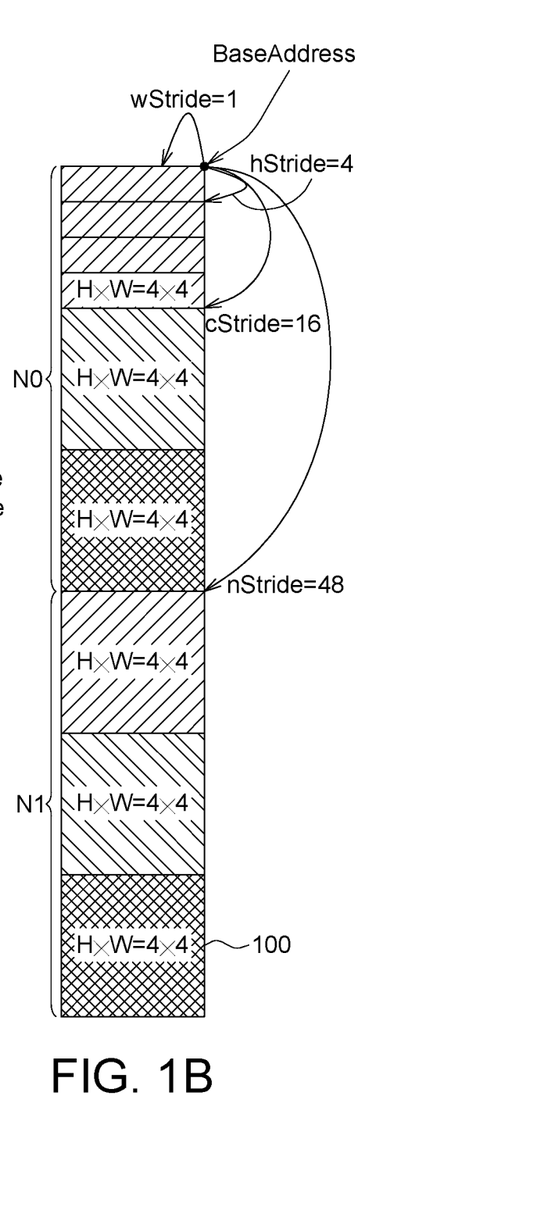
FIG. 1B is a schematic diagram of another example of a 4D tensor data stored in a memory.

FIG. 1B is a schematic diagram of another example of a 4D tensor data stored in a memory. The shape parameter (n, c, h, w) of 4D tensor data is defined as (2, 3, 4, 4), and the stride parameter (ns, cs, hs, ws) of 4D tensor data is defined as (48, 16, 4, 1). The image (n, c, h, w)=(2, 3, 4, 4) represents 2 frames, each frame has 3 channels (R, G, B), each of the R, G plane and B plane is formed of h*w (4*4) points. Therefore, there are 4*4*3*2=96 points in total, and each point has 1 byte.

Figure 2:
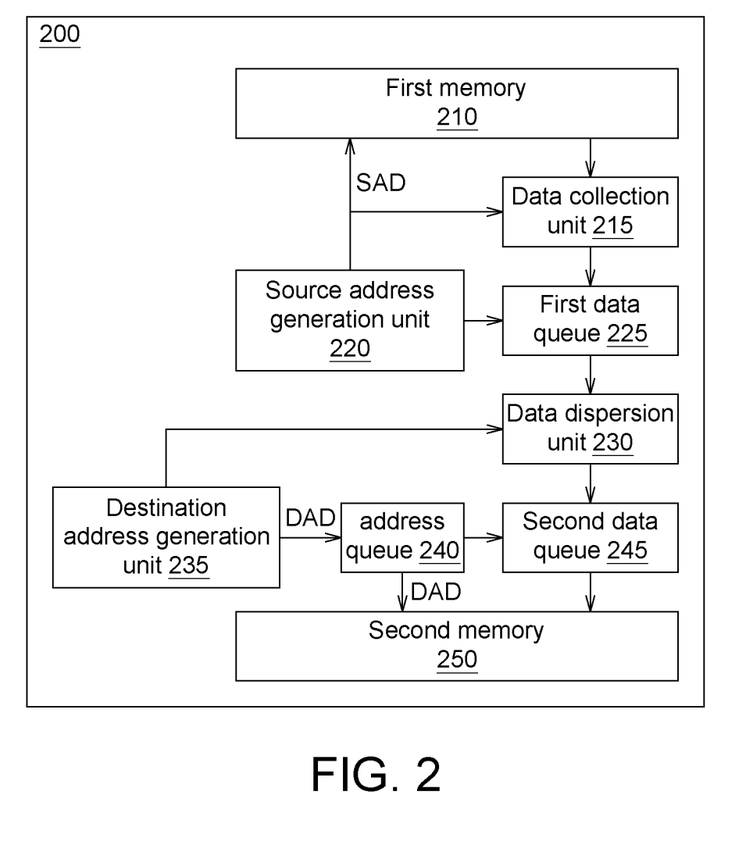
FIG. 2 is a functional block diagram of a hardware accelerator according to an embodiment of the present invention.

FIG. 2 is a functional block diagram of a hardware accelerator according to an embodiment of the present invention. The hardware accelerator 200 includes: a first memory 210, a data collection unit 215, a source address generation unit 220, a first data queue 225, a data dispersion unit 230, a destination address generation unit 235, an address queue 240, a second data queue 245, and a second memory 250. In possible embodiments of the present invention, the first memory 210 and the second memory 250 can be realized by: (1) the same memory unit, wherein the first memory 210 and the second memory 250 respectively occupy different addresses of the memory unit, (2) the same memory unit, wherein the first memory 210 and the second memory 250 respectively occupy the same addresses of the memory unit using an in-place algorithm, or (3) different memory units.

The hardware accelerator 200 of the present embodiment can perform tensor stride, tensor reshape, and tensor transpose. Furthermore, the hardware accelerator 200 of the present embodiment can perform any combination of tensor stride, tensor reshape, tensor transpose to achieve tensorflow depth-to-space permutation, and/or tensorflow space-to-depth permutation. Tensorflow is an operation defined by a particular AI framework and can have a different name (such pytorch) in other AI framework and are still within the spirit of the present invention.

The first memory 210 is used for receiving data transmitted from a data source (not illustrated in the diagram).

The data collection unit 215 is coupled to the first memory 210 for receiving data transmitted from the first memory 210.

The source address generation unit 220 is coupled to the data collection unit 215 for generating several source addresses SAD according to the source shape parameter (n, c, h, w) and the source stride parameter (ns, cs, hs, ws). The source shape parameter (n, c, h, w) and the source stride parameter (ns, cs, hs, ws) are user defined parameters.

The source address generation unit 220 transmits a source address SAD to the first memory 210. The first memory 210 transmits data to the data collection unit 215 according to the source address SAD. The data collection unit 215 collects data transmitted from the first memory 210.

The first data queue 225 is coupled to the data collection unit 215 for temporarily storing data transmitted from the data collection unit 215.

The data dispersion unit 230 is coupled to the first data queue 225 for dispersing data transmitted from the first data queue 225, wherein data transmitted from the first data queue 225 are data written to the first memory 210 according to the source shape parameter (n, c, h, w) and the source stride parameter (ns, cs, hs, ws).

The destination address generation unit 235 is coupled to the data dispersion unit 230 for generating several destination addresses DAD according to the destination shape parameter (n', c', h', w') and the destination stride parameter (ns', cs', hs', ws'). The destination shape parameter (n', c', h', w') and the destination stride parameter (ns', cs', hs', ws') are user defined parameters.

The address queue 240 is coupled to the destination address generation unit 235 for temporarily storing the destination addresses DAD generated by the destination address generation unit 235.

The second data queue 245 is coupled to the data dispersion unit 230 for temporarily storing data transmitted from the data dispersion unit 230.

The second memory 250 is coupled to the second data queue 245 for writing data transmitted from the second data queue 245 according to the destination addresses DAD generated by the destination address generation unit 235.

Figure 3:
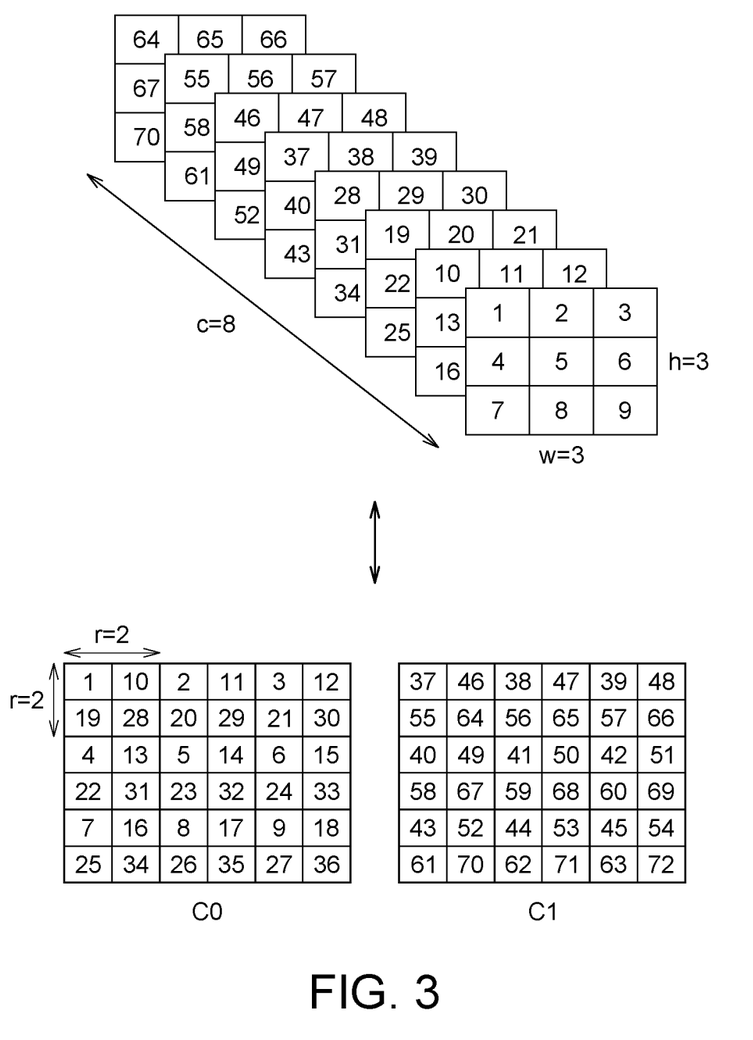
FIG. 3 is a schematic of an example of "tensorflow depth-to-space permutation" and "tensorflow space-to-depth permutation".

FIG. 3 is a schematic of an example of "tensorflow depth-to-space permutation" and "tensorflow space-to-depth permutation". The tensorflow depth-to-space permutation can rearrange data transmitted from depth data as space data; and the tensorflow space-to-depth permutation can rearrange data transmitted from space data as depth data. The upper part of FIG. 3 represents depth data, and the lower part of FIG. 3 represents space data. In the example of FIG. 3, the shape parameter (n, $cr^2$, h, w) of the 4D tensor depth data is (1, 8, 3, 3), and the shape parameter (n, c, rh, rw) of the 4D tensor space data is (1, 2, 6, 6). As indicated in FIG. 3, the parameter r represents block size, and r=2 indicates there are 2 block sizes.

Figure 4:
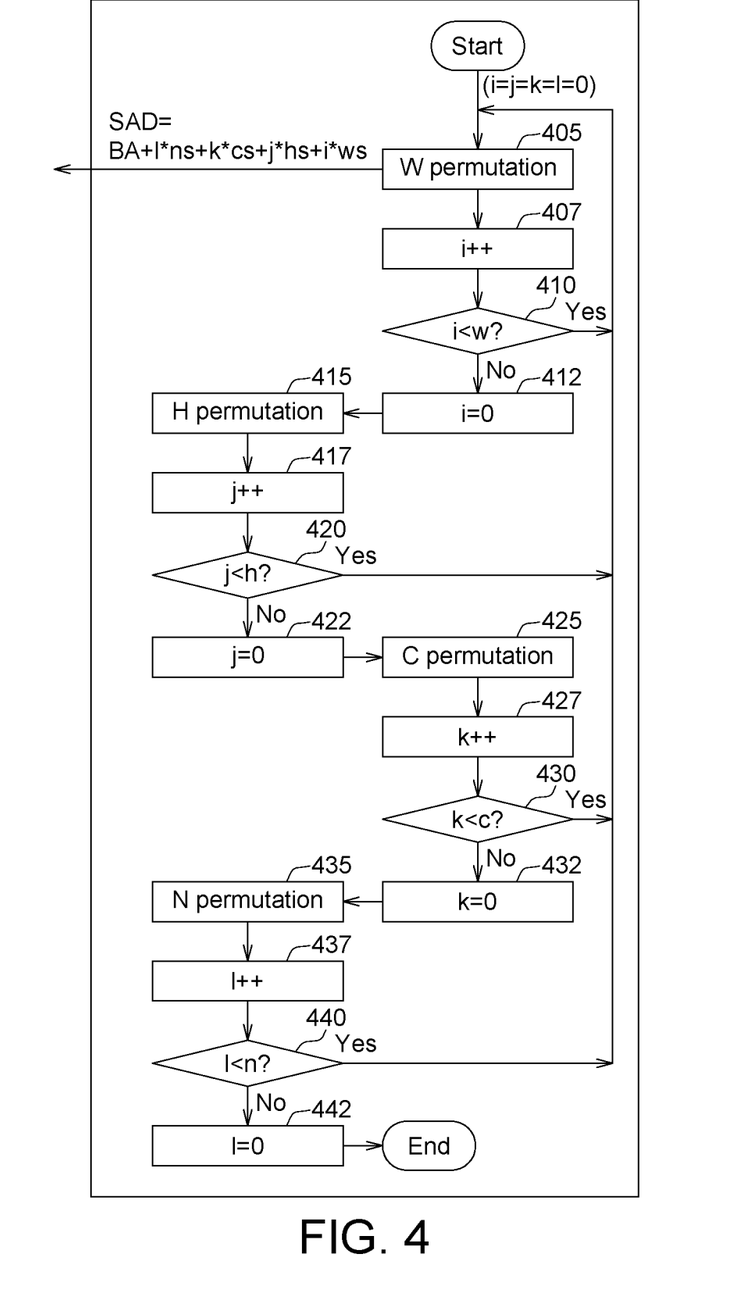
FIG. 4 is a flowchart of source address generation according to an embodiment of the present invention.

FIG. 4 is a flowchart of source address generation according to an embodiment of the present invention is shown. At the beginning, all of the parameters i, j, k and l are set to 0. As indicated in FIG. 4, when any of the parameters i, j, k and l is updated, a new source address SAD will be updated, wherein SAD=BA'l*ns+k*cs+j*hs+i*ws, and BA represents the base address (that is, the initial address) of the source address.

In step 405, data is permuted (arranged) in the width (W) direction (that is, data is read from the first memory 210 in the width direction W). Then, the procedure proceeds to step 407, i is added by 1. Then, the procedure proceeds to step 410, whether the parameter i is less than the parameter w is determined. If yes, the procedure returns to step 405, and a source address SAD is generated. If the determination in step 410 is negative, then the procedure proceeds to step 412. In step 412, the parameter i is set as 0 and the procedure proceeds to step 415. In step 415, data is arranged in the height (H) direction (that is, data is read from the first memory 210 in the height direction H). Then, the procedure proceeds to step 417, j is added by 1.

In step 420, whether the parameter j is less than the parameter h is determined. If yes, the procedure returns to step 405, and a source address SAD is generated. If the determination in step 420 is negative, the procedure proceeds to step 422, the parameter j is set as 0 and the procedure proceeds to step 425. In step 425, data is arranged in the direction C (that is, data is read from the first memory 210 in a direction C).

Then, the procedure proceeds to step 427, k is added by 1. In step 430, whether the parameter k is less than the parameter c is determined. If yes, the procedure returns to step 405, and a source address SAD is generated. If the determination in step 430 is negative, the procedure proceeds to step 432, the parameter k is set as 0 and the procedure proceeds to step 435. In step 435, data is arranged in the direction N (that is, data is read from the first memory 210 in a direction N).

Then, the procedure proceeds to step 437, the parameter l is added by 1. In step 440, whether the parameter l is less than the parameter n is determined. If yes, the procedure returns to step 405, and a source address SAD is generated. If the determination in step 440 is negative, the procedure proceeds to step 442, the parameter l is set as 0, and the procedure terminates.

As disclosed above, in total n*c*h*w source addresses SAD are generated.

Figure 5:
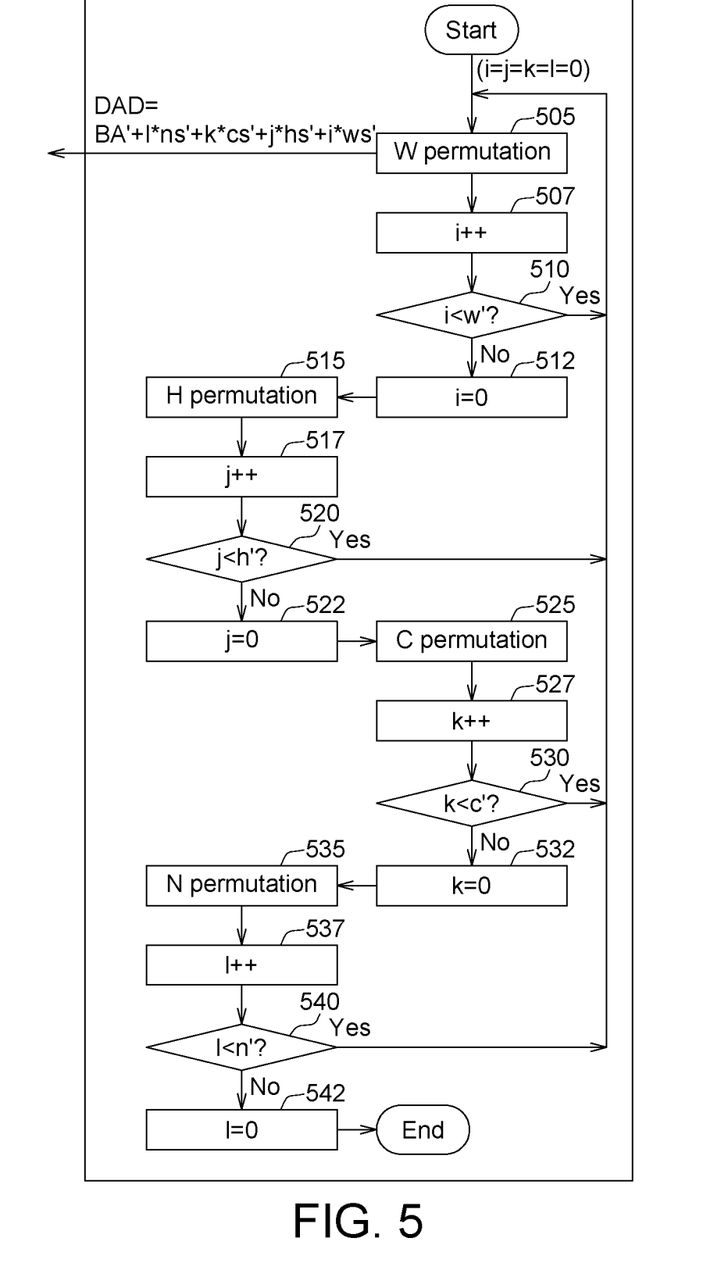
FIG. 5 is a flowchart of destination address generation according to an embodiment of the present invention.

FIG. 5 is a flowchart of destination address generation according to an embodiment of the present invention. At the beginning, all of the parameters i, j, k and l are set to 0. As indicated in FIG. 5, when any of the parameters i, j, k and l is updated, a new destination address DAD will be generated, wherein DAD=BA'+l*ns'+k*cs'+j*hs'+i*ws', and BA' represents the destination base address (that is, the initial address).

In step 505, data is arranged in the width (W) direction (that is, data is written to the second memory 250 in the width direction W). Then, the procedure proceeds to step 507, i is added by 1. Then, the procedure proceeds to step 510, whether the parameter i is less than the parameter w' is determined. If yes, the procedure returns to step 505, and a destination address DAD is generated. If the determination in step 510 is negative, the procedure proceeds to step 512, the parameter i is set as 0 and the procedure proceeds to step 515. In step 515, data is arranged in the height (H) direction (that is, data is written to the second memory 250 in the height direction H). Then, the procedure proceeds to step 517, j is added by 1.

In step 520, whether the parameter j is less than the parameter h' is determined. If yes, the procedure returns to step 505, and a destination address DAD is generated. If the determination in step 520 is negative, the procedure proceeds to step 522, the parameter j is set as 0 and the procedure proceeds to step 525. In step 525, data is arranged in the direction C (that is, data is written to the second memory 250 in a direction C).

Then, the procedure proceeds to step 527, k is added by 1. In step 530, whether the parameter k is less than the parameter c' is determined. If yes, the procedure returns to step 505, and a destination address DAD is generated. If the determination in step 530 is negative, the procedure proceeds to step 532, the parameter k is set as 0, and the procedure proceeds to step 535. In step 535, data is arranged in the direction N (that is, data is written to the second memory 250 in a direction N).

Then, the procedure proceeds to step 537, the parameter l is added by 1. In step 540, whether the parameter l is less than the parameter n' is determined. If yes, the procedure returns to step 505, and a destination address DAD is generated. If the determination in step 540 is negative, the procedure proceeds to step 542, the parameter l is set as 0, the procedure terminates.

As disclosed above, in total there are n'*c'*h'*w' destination addresses DAD generated.

A number of permutation used in the embodiments of the present invention are disclosed below.

(A) Tensor Stride (Tensor Copy With Stride)

Tensor stride can be used in "tensorflow depth-to-space permutation" and "tensorflow space-to-depth permutation".

Figure 6A:
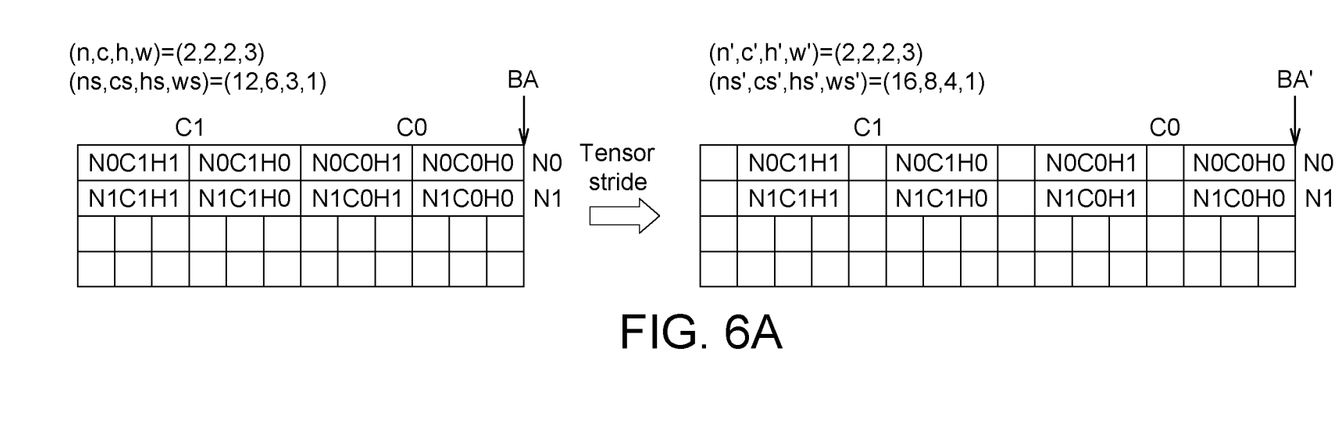
FIG. 6A and FIG. 6B are schematic diagrams of two exemplary examples of tensor stride according to an embodiment of the present invention.
Figure 6B:
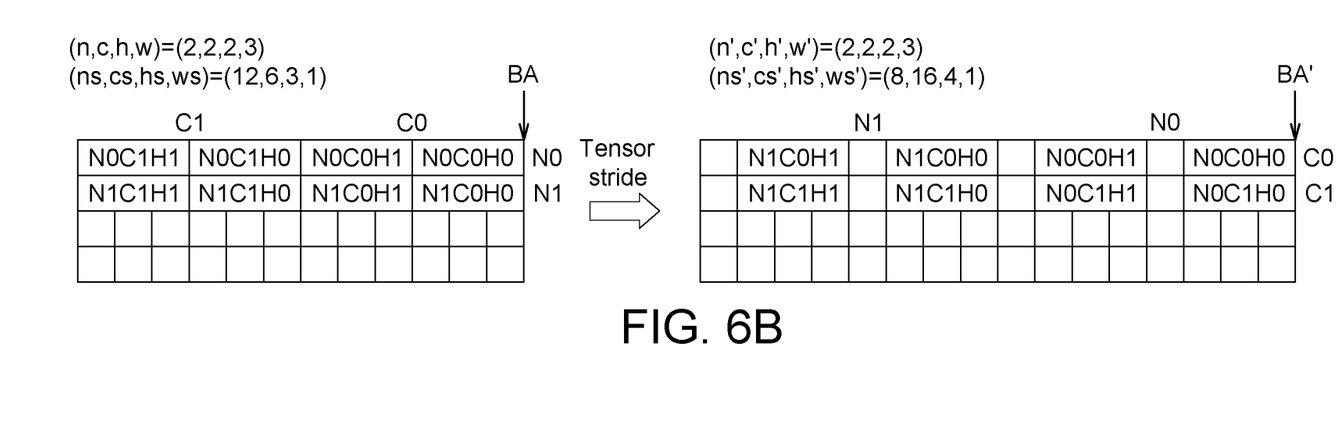

FIG. 6A and FIG. 6B are schematic diagrams of two exemplary examples of tensor stride according to an embodiment of the present invention. As indicated in FIG. 6A, the source shape parameter (n, c, h, w)=(2, 2, 2, 3), and the source stride parameter (ns, cs, hs, ws)=(12, 6, 3, 1). The destination shape parameter (n', c', h', w')=(2, 2, 2, 3), the destination stride parameter (ns', cs', hs', ws')=(16, 8, 4, 1).

In FIG. 6B, the source shape parameter (n, c, h, w) is (2, 2, 2, 3), and the source stride parameter (ns, cs, hs, ws) is (12, 6, 3, 1). The destination shape parameter (n', c', h', w') is (2, 2, 2, 3), and the destination stride parameter (ns', cs', hs', ws') is (8, 16, 4, 1).

That is, after tensor stride is performed, the source data and the destination data have the same shape, but the source data and the destination data are arranged in different positions.

(B) Tensor Reshape:

Tensor reshape can be used in "tensorflow depth-to-space permutation" and "tensorflow space-to-depth permutation".

Figure 7:
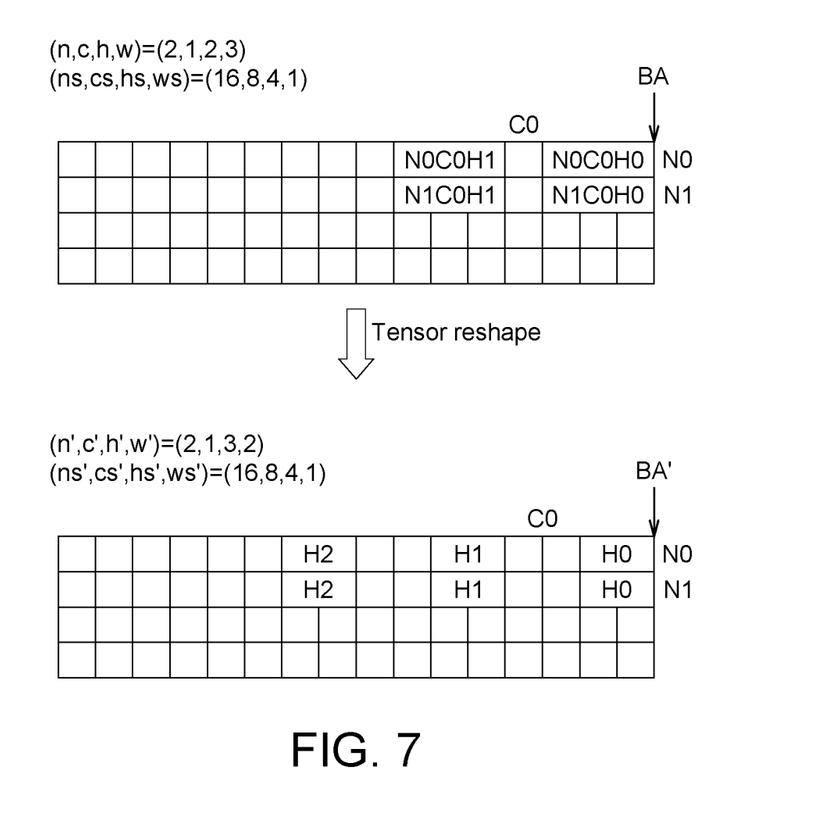
FIG. 7 is a schematic diagram of an exemplary example of tensor reshape according to an embodiment of the present invention.

FIG. 7 is a schematic diagram of an exemplary example of tensor reshape according to an embodiment of the present invention. As indicated in FIG. 7, the source shape parameter (n, c, h, w) is (2, 1, 2, 3), and the source stride parameter (ns, cs, hs, ws) is (16, 8, 4, 1). The destination shape parameter (n', c', h', w') is (2, 1, 3, 2), and the destination stride parameter (ns', cs', hs', ws') is (16, 8, 4, 1).

That is, after tensor reshape is performed, the source data and the destination data have different shapes (but the product of respective number of points in each dimension is the same).

(C) Tensor Transpose

Tensor transpose can be used in "tensorflow depth-to-space permutation" and "tensorflow space-to-depth permutation".

Figure 8:
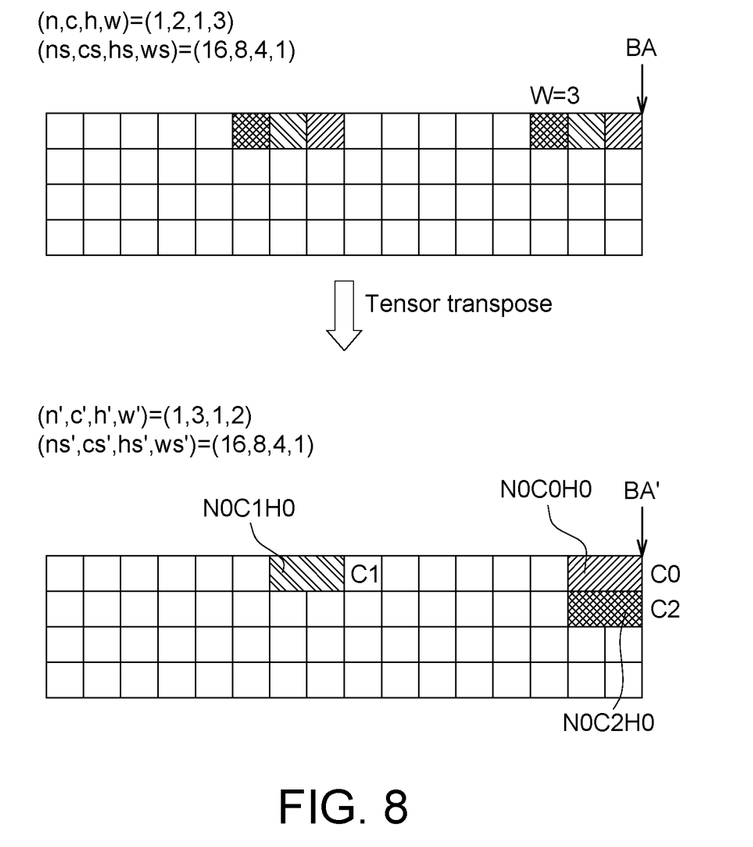
FIG. 8 is a schematic diagram of an exemplary example of tensor transpose according to an embodiment of the present invention.

FIG. 8 is a schematic diagram of an exemplary example of tensor transpose according to an embodiment of the present invention. As indicated in FIG. 8, the source shape parameter (n, c, h, w) is (1, 2, 1, 3), and the source stride parameter (ns, cs, hs, ws) is (16, 8, 4, 1). The destination shape parameter (n', c', h', w') is (1, 3, 1, 2), and the destination stride parameter (ns', cs', hs', ws') is (16, 8, 4, 1).

FIG. 8 can be regarded as a transpose of parameters c and w. In other possible examples of the present invention, any two different shape parameters can be transposed (such as n and w) and are still within the spirit of the present invention.

That is, after tensor transpose is performed, the source data and the destination data have different shapes (due to the transpose of two different shape parameters).

Details of "tensorflow depth-to-space permutation" according to an embodiment of the present invention are disclosed below.

The first tensorflow depth-to-space permutation algorithm:

An example of rearranging the source shape parameter (n, $cr^2$, h, w)=(1, 2*$2^2$, 3, 3)=(1, 8, 3, 3) and the destination shape parameter (n', c', rh', rw')=(1, 2, 2*3, 2*3)=(1, 2, 6, 6) is described.

The first tensorflow depth-to-space permutation algorithm includes 3 steps.

Figure 9A:
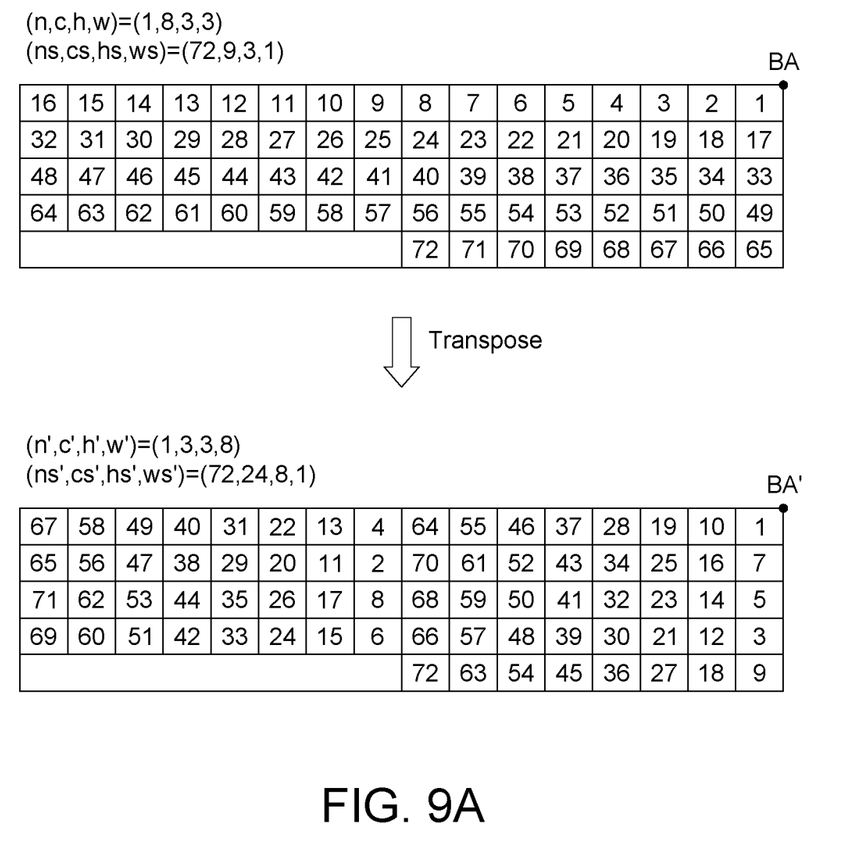
FIG. 9A to FIG. 9C are schematic diagrams of tensorflow depth-to-space permutation algorithm according to an embodiment of the present invention.

In the first step, tensor transpose is performed to transpose the parameters c and w. The following results are obtained: the source shape parameter (n, c, h, w) is (1, 8, 3, 3) and the source stride parameter (ns, cs, hs, ws) is (72,9,3,1). After tensor transpose is performed to transpose the parameter c and w, the destination shape parameter (n', c', h', w') is (1, 3, 3, 8) and the destination stride parameter (ns', cs', hs', ws') is (72, 24, 8, 1) as indicated in FIG. 9A.

In the second step, tensor reshape and tensor stride are performed on the results obtained in the first step.

Figure 9B:
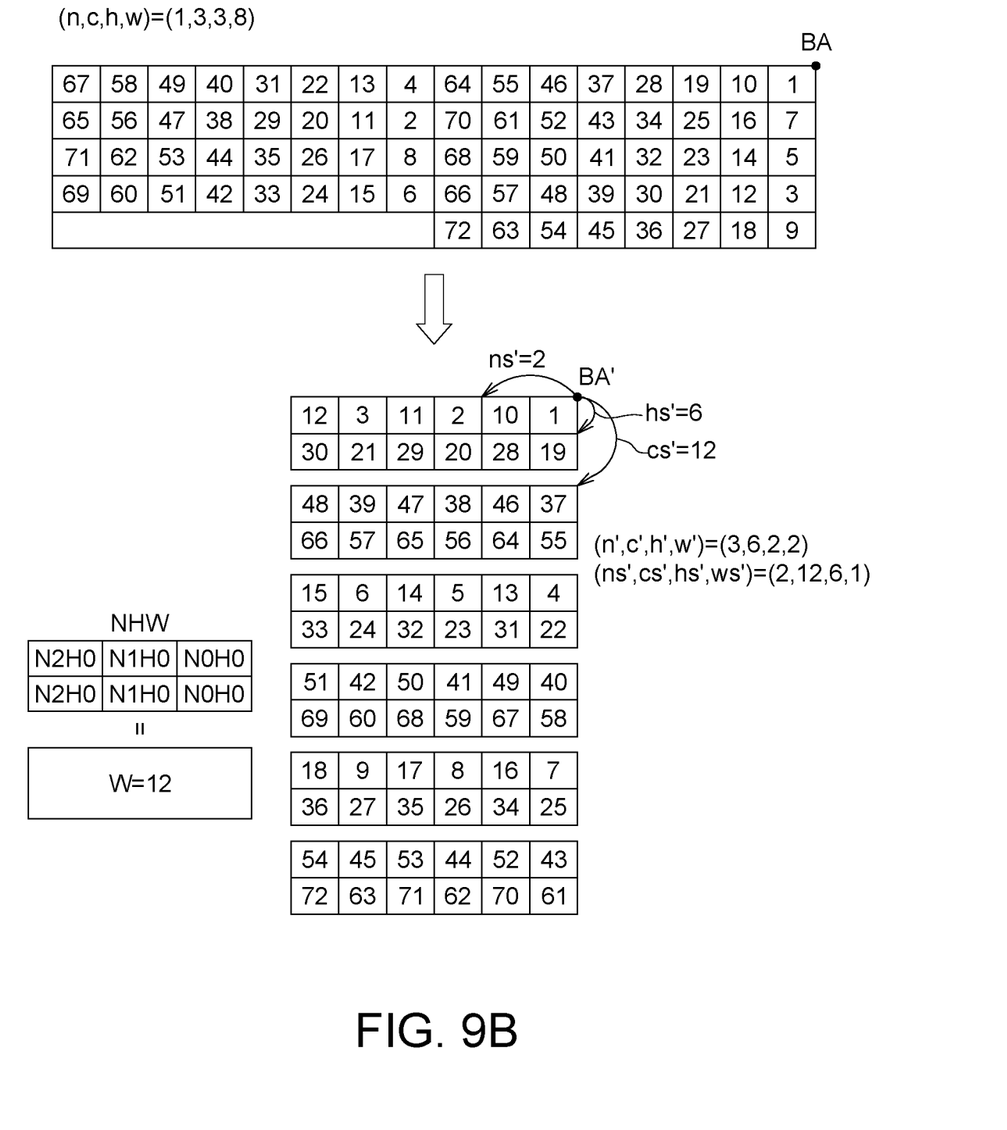

As indicated in FIG. 9B, tensor reshape and tensor stride are performed on the source shape parameter (n, c, h, w)=(1, 3, 3, 8) and the source stride parameter (ns, cs, hs, ws)=(72, 24, 8, 1). The following results are obtained: the destination shape parameter (n', c', h', w')=(3, 6, 2, 2) and the destination stride parameter (ns', cs', hs', ws')=(2(=r), 12 (=r*r*w), 6 (=r*w), 1).

When tensor stride is performed in the second step, n*h*w is regarded as a new w, and the following results are obtained: the destination shape parameter (n', c', h', w')=(1, 6, 1, 12) and the destination stride parameter (ns', cs', hs', ws')=(-, 12, -, 1), wherein the symbol "-" represents "don't care".

In the third step, tensor reshape and tensor stride are performed on the results obtained in the second step.

Figure 9C:
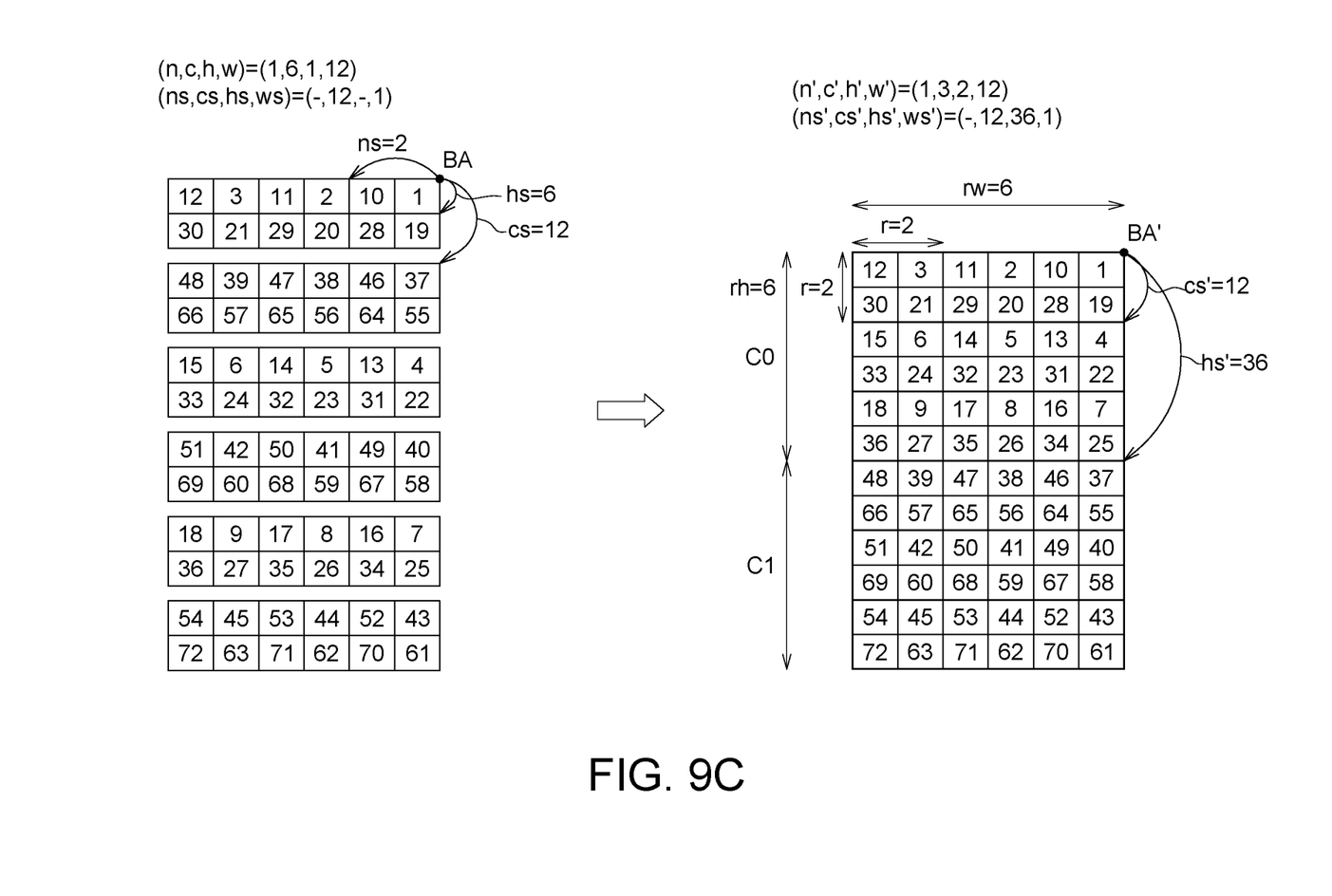

As indicated in FIG. 9C, after tensor reshape and tensor stride are performed using the source shape parameter (n, c, h, w)=(1, 6, 1, 12) and the source stride parameter (ns, cs, hs, ws)=(-, 12, -, 1). The following results are obtained: the destination shape parameter (n', c', h', w')=(1, 3, 2, 12) and the destination stride parameter (ns', cs', hs', ws')=(-, 12, 36, 1).

The first tensorflow depth-to-space permutation algorithm can achieve "tensorflow depth-to-space permutation" by performing (1) Tensor transpose; (2) Tensor reshape and tensor stride; and (3) Tensor reshape and tensor stride.

The second tensorflow depth-to-space permutation algorithm:

The source shape parameter (n, c, h, w)=(1, 2048, 8, 6) is permutated as the destination shape parameter (n', c', h', w')=(1, 512, 16, 12). Here, the parameter c is defined as $c_1 * r^2$, wherein r represents block size. In the above example, c=2048, c1=512, and r=2.

The second tensorflow depth-to-space permutation algorithm includes several repeats of tensor stride.

During the first tensor stride, the parameter $r^2$ is substituted into the parameter c, that is, the source shape parameter (n, c, h, w) is (1, 4 (=$r^2$), 8, 6). The following results are obtained: the source shape parameter (n, c, h, w) is (1, 4 (=$r^2$), 8, 6) and the source stride parameter (ns, cs, hs, ws) is (-, 48, 6, 1). After tensor stride is performed, the destination shape parameter (n', c', h', w') is (2, 2, 8, 6) and the destination stride parameter (ns', cs', hs', ws') is (12(=r*w), 1, 24 (=r*r*w), 2 (=r)).

Then, the above tensor stride is repeated for c1 times.

That is, in the second tensorflow depth-to-space permutation algorithm, each permutation deals with one c1 plane, therefore the permutation is repeated for several times.

The second tensorflow depth-to-space permutation algorithm can achieve "tensorflow depth-to-space permutation" through several repeats of tensor stride.

The third tensorflow depth-to-space permutation algorithm:

The source shape parameter (n, c, h, w)=(1, 2048, 8, 6) is permutated as the destination shape parameter (n', c', h', w')=(1, 512, 16, 12). Here, the parameter c is defined as $c_1 * r^2$, wherein r represents block size. In the above example, c=2048, c1=512, and r=2.

The third tensorflow depth-to-space permutation algorithm includes $r^2$ repeats of the tensor stride step.

During the first tensor stride step, the parameter c1 is substituted into the parameter c, that is, the source shape parameter (n, c, h, w) is (1, 512 (=c1), 8, 6). The following results are obtained: the source shape parameter (n, c, h, w) is (1, 512, 8, 6) and the source stride parameter (ns, cs, hs, ws) is (-, 192 (=r*r*h*w), 6 (=w), 1), and the source base address BA (that is, the initial address) is SourceBaseAddr.

After tensor stride is performed, the destination shape parameter (n', c', h', w') is (1, 512, 8, 6) and the destination stride parameter (ns', cs', hs', ws') is (-, 192 (=r*r*h*w), 12 (=r*w), 2 (=r)), and the destination base address BA' (that is, the initial address) is DestinationBaseAddr.

During the second tensor stride step, the parameter c1 is substituted into the parameter c, that is, the source shape parameter (n, c, h, w) is (1, 512 (=c1), 8, 6). The following results are obtained: the source shape parameter (n, c, h, w) is (1, 512, 8, 6) and the source stride parameter (ns, cs, hs, ws) is (-, 192 (=r*r*h*w), 6 (=w), 1), and the source base address BA (that is, the initial address) is SourceBaseAddr+1*h*w=SourceBaseAddr+48. After tensor stride is performed, the destination shape parameter (n', c', h', w') is (1, 512, 8, 6) and the destination stride parameter (ns', cs', hs', ws') is (-, 192 (=r*r*h*w), 12 (=r*w), 2 (=r)), and the destination base address BA' (that is, the initial address) is DestinationBaseAddr+1.

During the third tensor stride step, the parameter c1 is substituted into the parameter c, that is, the source shape parameter (n, c, h, w) is (1, 512 (=c1), 8, 6). The following results are obtained: the source shape parameter (n, c, h, w) is (1, 512, 8, 6) and the source stride parameter (ns, cs, hs, ws) is (-, 192 (=r*r*h*w), 6 (=w), 1), and the source base address BA (that is, the initial address) being SourceBaseAddr+2*h*w is SourceBaseAddr+96. After tensor stride is performed, the destination shape parameter (n', c', h', w') is (1, 512, 8, 6) and the destination stride parameter (ns', cs', hs', ws') is (-, 192 (=r*r*h*w), 12 (=r*w), 2 (=r)), and the destination base address BA' (that is, the initial address) being DestinationBaseAddr+r*w is DestinationBaseAddr+12.

During the fourth repeat of the tensor stride step, the parameter c1 is substituted into the parameter c, that is, the source shape parameter (n, c, h, w) is (1, 512 (=c1), 8, 6). The following results are obtained: the source shape parameter (n, c, h, w) is (1, 512, 8, 6) and the source stride parameter (ns, cs, hs, ws) is (-, 192 (=r*r*h*w), 6 (=w), 1), and the source base address BA (that is, the initial address) being SourceBaseAddr+3*h*w is SourceBaseAddr+144. After tensor stride is performed, the destination shape parameter (n', c', h', w') is (1, 512, 8, 6) and the destination stride parameter (ns', cs', hs', ws') is (-, 192 (=r*r*h*w), 12 (=r*w), 2 (=r)), and the destination base address BA' (that is, the initial address) being DestinationBaseAddr+r*w+1 is DestinationBaseAddr+13.

In each repeat of tensor stride, the base address BA of the source address is increased by h*w.

In each repeat of tensor stride, the destination base address BA' is DestinationBaseAddress+offset1, wherein offset1 is (i-1)*r*w, (i-1)*r*w+1, . . . , (i-1)*r*w+(i-1), and i=1~r.

The third tensorflow depth-to-space permutation algorithm can achieve "tensorflow depth-to-space permutation" through several repeats of tensor stride.

Details of "tensorflow space-to-depth permutation" according to an embodiment of the present invention are disclosed below. Basically, the "tensorflow space-to-depth permutation" according to an embodiment of the present invention can be regarded as an inverse operation of the "tensorflow depth-to-space permutation" according to an embodiment of the present invention disclosed above.

The first tensorflow space-to-depth permutation algorithm:

Let the permutation of rearranging source shape parameter (n, c, h, w)=(1, 2, 6, 6) as the destination shape parameter (n', c', h', w')=(1, 8, 3, 3) be taken for example.

Here, the parameter c' is defined as $c1*r^2$, wherein r represents block size. In the above example, c'=8, and c1=2, r=2.

The first tensorflow space-to-depth permutation algorithm includes 3 steps.

In the first step, tensor reshape and tensor stride are performed.

The destination shape parameter (n', c', h', w')=(1, 2, 3, 12) is obtained from the source shape parameter (n, c, h, w)=(1, 2, 6, 6). In the present step, no move is made, and the shape can be regarded as a closely arranged shape.

After tensor stride is performed on the source shape parameter (n, c, h, w)=(1, 2, 3, 12), the following results are obtained: the destination shape parameter (n', c', h', w') is (1, 2, 3, 12) and the destination stride parameter (ns', cs', hs', ws') is (-, 12 (=r*r*w), 24 (=r*r*w*c1), 1).

In the second step, tensor reshape and tensor stride are performed on the results obtained in the first step.

The destination shape parameter (n', c', h', w')=(3, 4, 3, 2) is obtained from the source shape parameter (n, c, h, w)=(1, 2, 3, 12). In the present step, no move is made, and the shape can be regarded as a closely arranged shape.

Then, the tensor stride of the second step is performed on the source shape parameter (n, c, h, w)=(3, 4, 3, 2), and the following results are obtained: the destination shape parameter (n', c', h', w') is (3, 4, 3, 2) and the destination stride parameter (ns', cs', hs', ws') is (8 (=c1*r*r), 2 (=r), 24 (=r*r*c1*h), 1).

In the third step, tensor reshape and tensor transpose are performed. The destination shape parameter (n', c', h', w')= (1, 3, 3, 8) is obtained from the source shape parameter (n, c, h, w)=(3, 4, 3, 2). In the present step, no move is made, and the shape can be regarded as a closely arranged shape.

Then, tensor transpose is performed on the source shape parameter (n, c, h, w)=(1, 3, 3, 8), and the destination shape parameter (n', c', h', w')=(1, 8, 3, 3) is obtained using the transpose of the parameters c and w.

The first tensorflow space-to-depth permutation algorithm can achieve "tensorflow space-to-depth permutation" by performing (1) Tensor reshape and tensor stride; (2) Tensor reshape and tensor stride; and (3) Tensor reshape and tensor transpose.

The second tensorflow space-to-depth permutation algorithm:

Let the permutation of rearranging the source shape parameter (n, c, h, w)=(1, 2, 6, 6) as the destination shape parameter (n', c', h', w')=(1, 8, 3, 3) be taken for example. Here, the parameter c' is defined as $c1*r^2$, wherein r represents block size. In the above example, c'=8, and c1=2, r=2.

The second tensorflow space-to-depth permutation algorithm includes several repeats of the tensor stride (that is, c1 repeats).

During the first tensor stride, the source shape parameter (n, c, h, w) is (3, 2, 3, 2), and the source base address BA (that is, the initial address) is SourceBaseAddress. After tensor stride is performed, the destination shape parameter (n', c', h', w') is (3, 2, 3, 2) and the destination stride parameter (ns', cs', hs', ws') is (3 (=w), 18 (=r*h*w), 1, 9 (=w*h), and the destination base address BA' (that is, the initial address) is DestinationBaseAddress.

During the second tensor stride, the source shape parameter (n, c, h, w) is (3, 2, 3, 2), and the source base address BA (that is, the initial address) being SourceBaseAddress+r*r*w*h is SourceBaseAddress+36. After tensor stride is performed, the destination shape parameter (n', c', h', w') is (3, 2, 3, 2) and the destination stride parameter (ns', cs', hs', ws') is (3 (=w), 18 (=r*h*w), 1, 9 (=w*h), and the destination base address BA' (that is, the initial address) being DestinationBaseAddress+r*r*w*h is DestinationBaseAddress+36.

The second tensorflow space-to-depth permutation algorithm can achieve "tensorflow space-to-depth permutation" through the repeats of tensor stride.

The third tensorflow space-to-depth permutation algorithm:

The source shape parameter (n, c, h, w)=(1, 512, 16, 12) is rearranged as the destination shape parameter (n', c', h', w')=(1, 2048, 8, 6). Here, the parameter c is defined as $c1*r^2$, wherein r represents block size. In the above example, c=2048, and c1=512, r=2.

The third tensorflow space-to-depth permutation algorithm includes r2 repeats of the tensor stride step.

During the first tensor stride step, the parameter c1 is substituted into the parameter c, that is, the source shape parameter (n, c, h, w) is (1, 512 (=c1), 8, 6), the source shape parameter (n, c, h, w) is (1, 512, 8, 6) and the source stride parameter (ns, cs, hs, ws) is (-, 192 (=r*r*h*w), 24 (=r*r*w), 2 (=r)), and the source base address BA (that is, the initial address) is SourceBaseAddress. After tensor stride is performed, the destination shape parameter (n', c', h', w') is (1, 512, 8, 6) and the destination stride parameter (ns', cs', hs', ws') is (-, 192 (=r*r*h*w), 6 (=w), 1), and the destination base address BA' (that is, the initial address) is DestinationBaseAddress.

During the second tensor stride step, the parameter c1 is substituted into the parameter c, that is, the source shape parameter (n, c, h, w) is (1, 512 (=c1), 8, 6), the source shape parameter (n, c, h, w) is (1, 512, 8, 6) and the source stride parameter (ns, cs, hs, ws) is (-, 192 (=r*r*h*w), 24 (=r*r*w), 2 (=r)), and the source base address BA (that is, the initial address) is SourceBaseAddress+1. After tensor stride is performed, the destination shape parameter (n', c', h', w') is (1, 512, 8, 6) and the destination stride parameter (ns', cs', hs', ws') is (-, 192 (=r*r*h*w), 6 (=w), 1), and the destination base address BA' (that is, the initial address) being DestinationBaseAddress+1*h*w is DestinationBaseAddress+48.

During the third tensor stride step, the parameter c1 is substituted into the parameter c, that is, the source shape parameter (n, c, h, w) is (1, 512 (=c1), 8, 6) and the source stride parameter (ns, cs, hs, ws) is (-, 192 (=r*r*h*w), 24 (=r*r*w), 2 (=r)), and the source base address BA (that is, the initial address) being SourceBaseAddress+r*w is SourceBaseAddress+12. After tensor stride is performed, the destination shape parameter (n', c', h', w') is (1, 512, 8, 6) and the destination stride parameter (ns', cs', hs', ws') is (-, 192 (=r*r*h*w), 6 (=w), 1), and the destination base address BA' (that is, the initial address) being DestinationBaseAddress+2*h*w is DestinationBaseAddress+96.

In the fourth repeat of the tensor stride step, the parameter c1 is substituted into the parameter c, that is, the source shape parameter (n, c, h, w) is (1, 512 (=c1), 8, 6) and the source stride parameter (ns, cs, hs, ws) is (-, 192 (=r*r*h*w), 24 (=r*r*w), 2 (=r)), and the source base address BA (that is, the initial address) being SourceBaseAddress+r*w+1 is SourceBaseAddress+13. After tensor stride is performed, the destination shape parameter (n', c', h', w') is (1, 512, 8, 6) and the destination stride parameter (ns', cs', hs', ws') is (-, 192 (=r*r*h*w), 6 (=w), 1), and the destination base address BA' (that is, the initial address) being DestinationBaseAddress+3*h*w is DestinationBaseAddress+144.

In each repeat of the tensor stride, the base address BA of the source address is SourceBaseAddress+offset2, wherein offset2=(i-1)*r*w, (i-1)*r*w+1, . . . , (i-1)*r*w+(i-1), and i=1~r.

In each repeat of the tensor stride, the destination base address BA' is increased by h*w.

The third tensorflow space-to-depth permutation algorithm can achieve "tensorflow space-to-depth permutation" through several repeats of tensor stride.

As disclosed above, the hardware accelerator of one embodiment of the present invention more efficiently implements "tensorflow space-to-depth permutation" and "tensorflow depth-to-space permutation", meanwhile, reduces the frequent switching between the hardware accelerator and the central processing unit (CPU), reduces the CPU load, and increases the overall AI computing efficiency.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hardware accelerator, comprising:
   a first memory used for receiving data;
   a source address generation unit coupled to the first memory for generating a plurality of source addresses to the first memory according to a source shape parameter and a source stride parameter, wherein the first memory transmits data according to the source addresses;
   a data collection unit coupled to the first memory used for receiving data transmitted from the first memory;
   a first data queue coupled to the data collection unit used for temporarily storing data transmitted from the data collection unit;
   a data dispersion unit coupled to the first data queue used for dispersing data transmitted from the first data queue;
   a destination address generation unit coupled to the data dispersion unit for generating a plurality of destination addresses according to a destination shape parameter and a destination stride parameter;
   an address queue coupled to the destination address generation unit for temporarily storing the destination addresses generated by the destination address generation unit;
   a second data queue coupled to the data dispersion unit for temporarily storing data transmitted from the data dispersion unit; and
   a second memory coupled to the second data queue for writing data transmitted from the second data queue according to the destination addresses generated by the destination address generation unit,
   wherein the hardware accelerator performs tensor stride, tensor reshape and tensor transpose to achieve tensorflow depth-to-space permutation and tensorflow space-to-depth permutation, and
   after tensor stride is performed, the source shape parameter and the destination shape parameter are the same, but the source stride parameter and the destination stride parameter are different.

2. The hardware accelerator according to claim 1, wherein the source shape parameter and the source stride parameter are user defined parameters.

3. The hardware accelerator according to claim 1, wherein the destination shape parameter and the destination stride parameter are user defined parameters.

4. The hardware accelerator according to claim 1, wherein after tensor reshape is performed, the source shape parameter and the destination shape parameter are different.

5. The hardware accelerator according to claim 1, wherein after tensor transpose is performed, the source shape parameter and the destination shape parameter are different.

6. The hardware accelerator according to claim 1, wherein tensorflow depth-to-space permutation is achieved by performing tensor transpose, tensor reshape and tensor stride, and tensor reshape and tensor stride.

7. The hardware accelerator according to claim 1, wherein tensorflow depth-to-space permutation is achieved through a plurality of repeats of tensor stride.

8. The hardware accelerator according to claim 1, wherein tensorflow space-to-depth permutation is achieved by performing tensor reshape and tensor stride, and tensor reshape and tensor transpose.

9. The hardware accelerator according to claim 1, wherein tensorflow space-to-depth permutation is achieved through a plurality of repeats of tensor stride.

* * * * *